May 4, 1954   J. L. BRANN, JR   2,677,576
SPRAYING APPARATUS
Filed April 7, 1950   5 Sheets-Sheet 1

Inventor
James L. Brann Jr.
by Roberts, Cushman & Groves
Att'ys.

May 4, 1954   J. L. BRANN, JR   2,677,576
SPRAYING APPARATUS

Filed April 7, 1950   5 Sheets-Sheet 2

Inventor
James L. Brann Jr.
by Roberts, Cushman & Grover
Att'ys.

May 4, 1954   J. L. BRANN, JR   2,677,576
SPRAYING APPARATUS
Filed April 7, 1950   5 Sheets-Sheet 4

Inventor
James L. Brann Jr.
by Roberts, Cushman & Grover
Att'ys.

May 4, 1954  J. L. BRANN, JR  2,677,576
SPRAYING APPARATUS
Filed April 7, 1950  5 Sheets-Sheet 5

Inventor
James L. Brann Jr.
by Robert, Buchanan, & Jones
Att'ys.

Patented May 4, 1954

2,677,576

UNITED STATES PATENT OFFICE 2,677,576

SPRAYING APPARATUS

James Lewis Brann, Jr., Ithaca, N. Y.

Application April 7, 1950, Serial No. 154,573

5 Claims. (Cl. 299—18)

The invention relates to spraying equipment and more particularly to equipment of the type used in concentrated mist spraying.

During the growing process of fruits and other crops it is necessary to apply chemical agents thereto to prevent injury by insects and diseases. Fertilizers and hormones are also often applied to plants by progressive growers to control the plant's growth and development. Until recently applications of such materials have been made by means of high pressure sprayers using a relatively small amount of active chemical material dissolved or suspended in water or by means of dusters dispersing an inactive solid carrier having the active chemical mixed therewith. It has now been found that it is possible to apply these active chemicals to certain crops at concentrations of from 10 to 100 times as high as is used in the older techniques by injecting a concentrated solution (or suspension) of the chemical material into an air stream which carries the solution onto the foliage of the plant being treated. By using this new technique it is possible to obtain satisfactory results when using $1/10$ to $1/100$ the total amount of liquid per unit of crop treated required by the high pressure spraying technique; and in some cases it is possible to obtain equivalent or superior results with less active chemical.

Objects of this invention are to provide spraying apparatus which will apply active chemical agents or materials upon foliage in the form of a mist by means of a jet or stream of air, which provides a spray pattern having a conical envelope, which simultaneously sprays a large area, which automatically regulates the amount of chemical material introduced into the air stream so that greater amounts of material are injected in the portion of the spray pattern directed towards the upper parts of the envelope, which is compact and portable, which requires a single operator, which has a self-contained power unit, which carries a large amount of active chemical material, which is simple in design, which is attractive and pleasing in appearance, and which requires a minimum of maintenance.

In a broad aspect the invention contemplates a prime mover, such as an internal combustion engine or an electric motor, arranged to drive an air blower. Conduit means are connected to the outlet of the blower to direct the air discharge therefrom in a path or locus having a conical envelope, for example by moving the conduit and in an orbital path, thus increasing the area covered thereby. Nozzle means is positioned in the air jet to inject active chemical material into the conical air jet, either in solution or in suspension, so that the jet distributes the chemical material over the area included therein.

In another aspect the outlet of the blower is connected to a turret which is revolved by means of power taken from the blower or otherwise. Projecting from the turret are a plurality of air directing nozzles arranged so that rotation of the turret moves the nozzles orbitally to direct the jets of air therefrom in a path having a conical envelope. Positioned in each of the nozzles is an injection nozzle for injecting active chemical material into the jet so that the material is distributed by the air.

In a more specific aspect the amount of active material supplied to the respective injection nozzles is varied with respect to the position of the corresponding air nozzles by means, such as a distribution valve positioned in the conduit means, connecting the reservoir or tank holding the supply of active material and the injection nozzles. Preferably the conduit means includes a pump and a portion of pipe or tubing with its axis coinciding with the axis of rotation of the turret. The distribution valve is at the end of the pipe and is connected to the various injection nozzles by flexible conduits such as hoses. The distribution pattern of the active material in the envelope may be varied relatively with respect to the remainder of the apparatus by means which adjustably rotate the pipe or tube and the distribution valve connected thereto.

In another aspect the apex angle of the conical envelope is adjustable, the air discharge nozzles being each provided with a yieldable portion and the respective movable ends thereof connected respectively to the distribution valve by mechanical links such as turnbuckles. Means are provided for axially moving the tube or pipe supporting the distribution valve so that the effective diameter of the orbit of the air discharge nozzles is changed thus varying the apex angle of the spray pattern envelope. Preferably the upwardly projecting angle of the turret is changed with variations in the apex angle of the spray pattern envelope, either conjointly by means of interconnected controls or separately by manually operated means so that the lowest portion of the spray pattern is maintained in the same relative position with respect to the terrain in all positions of the air discharge nozzles.

In a further aspect the invention contemplates a spray nozzle for injecting the solution of active chemical material in the air stream comprising two telescoping members carrying respectively a valve seat and a mating valve surface. Preferably the seat and mating surface are conical so that the fluid is discharged outwardly into the air stream with a conical spray pattern. The members are biased in telescoped relationship by means of a spring thereby to bring the valve surface and the seat into closing contact. Means are provided for introducing fluid under pressure through one of the members into contact with the other member so that the latter member moves against the biasing force of the spring thus opening the valve to discharge the solution.

In one specific aspect the nozzle comprises a hollow outer member having a partition dividing its interior into two cavities. The portion of the outer member closing the portion of one of the cavities opposite the partition forms a valve seat carried upon the end of a hollow inner member which telescopes within the cavities in the outer member. A spring located in the other cavity is interposed between the partition and a projecting portion from the inner member, such as a snap ring, thereby telescoping the members to bring the valve surface into closing contact with the valve seat. The inner member has a passage extending through its wall to connect the interior thereof with the cavity adjacent the valve surface so that fluid under pressure introduced through the hollow inner member moves the outer member against the spring biasing force to open the valve.

In another specific aspect the valve comprises a hollow outer member having a valve seat at one end thereof for mating with a valve surface carried upon a telescoping inner member. The outer member has an apertured partition which divides the interior into two cavities. A spring is located in one of the cavities so that it is interposed between the partition and a projecting portion of the inner member to maintain the members in telescoped relationship with the valve surface in closing contact with the valve seat. A passageway is provided in the outer member for connecting the spring cavity with a supply of fluid under pressure which fluid passes through the apertured partition moving the inner member against the spring biasing force thus opening the valve.

Further objects will be apparent from a consideration of the following description and the accompanying drawings, wherein:

Fig. 13 is a fragmentary view in partial section showing the mechanism for moving the turret.

Figure 1:
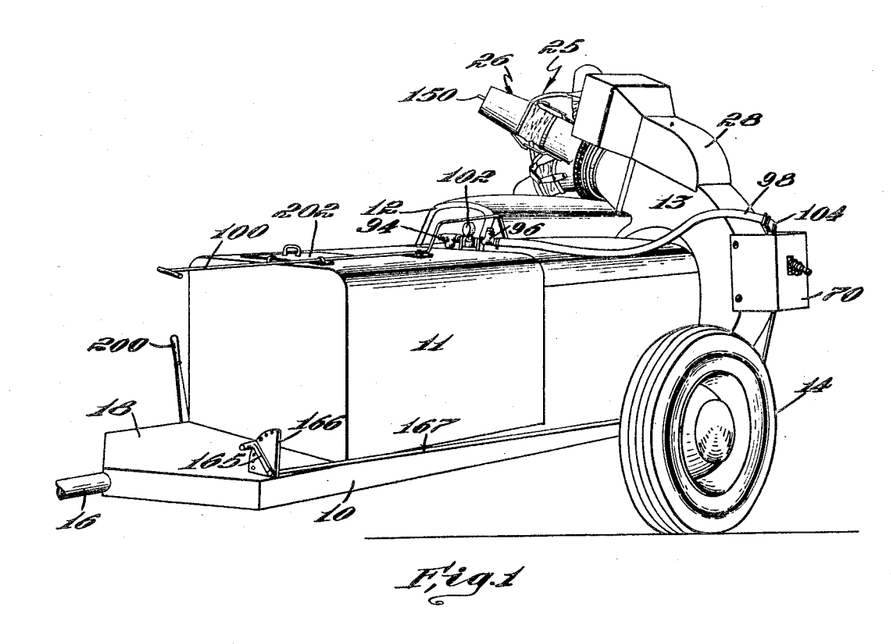
Fig. 1 is an isometric view of the spray apparatus.

Referring to Fig. 1, the spray apparatus illustrated comprises a frame 10 of structure members whereupon is supported a tank 11 which is a reservoir for the active chemical material to be sprayed, and a prime mover such as the internal combustion engine 12 for driving a conventional compressed air blower 13 by means of a multiple V-belt drive shown in Fig. 11 and described in detail below. The frame 10 is mounted upon a pair of pneumatically tired wheels 14 so that the apparatus can be towed by a truck or tractor by means of a draw bar 16. A platform 18 is provided at the forward end of the frame 10 for the operator to stand upon when the tank 11 is being filled as will be described hereinafter.

Figure 2:
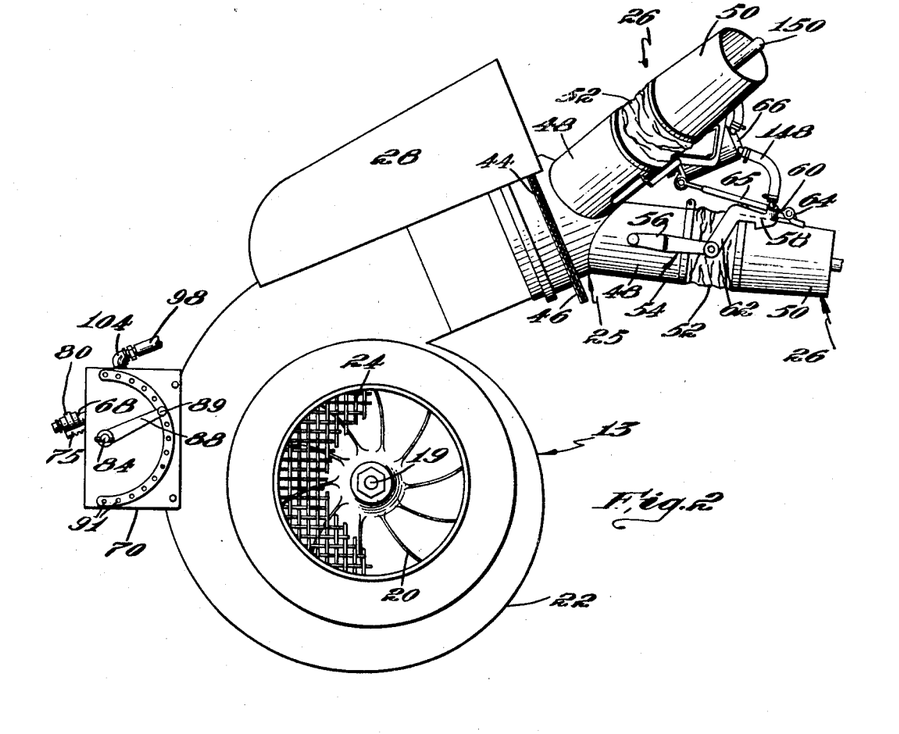
Fig. 2 is a partial end view showing the blower and air distribution turret.
Figure 3:
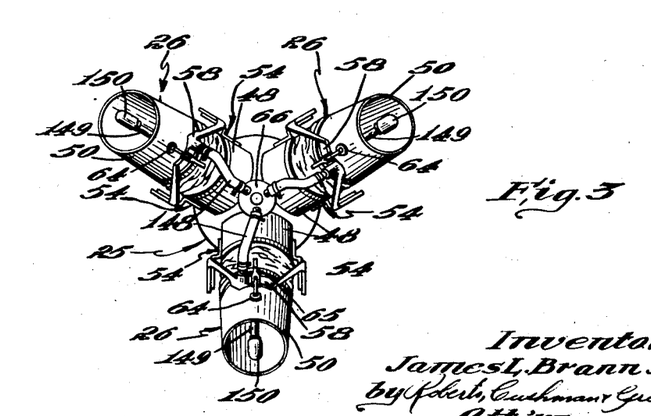
Fig. 3 is a partial side view showing the end of the turret.
Figures 3, 4, 5:
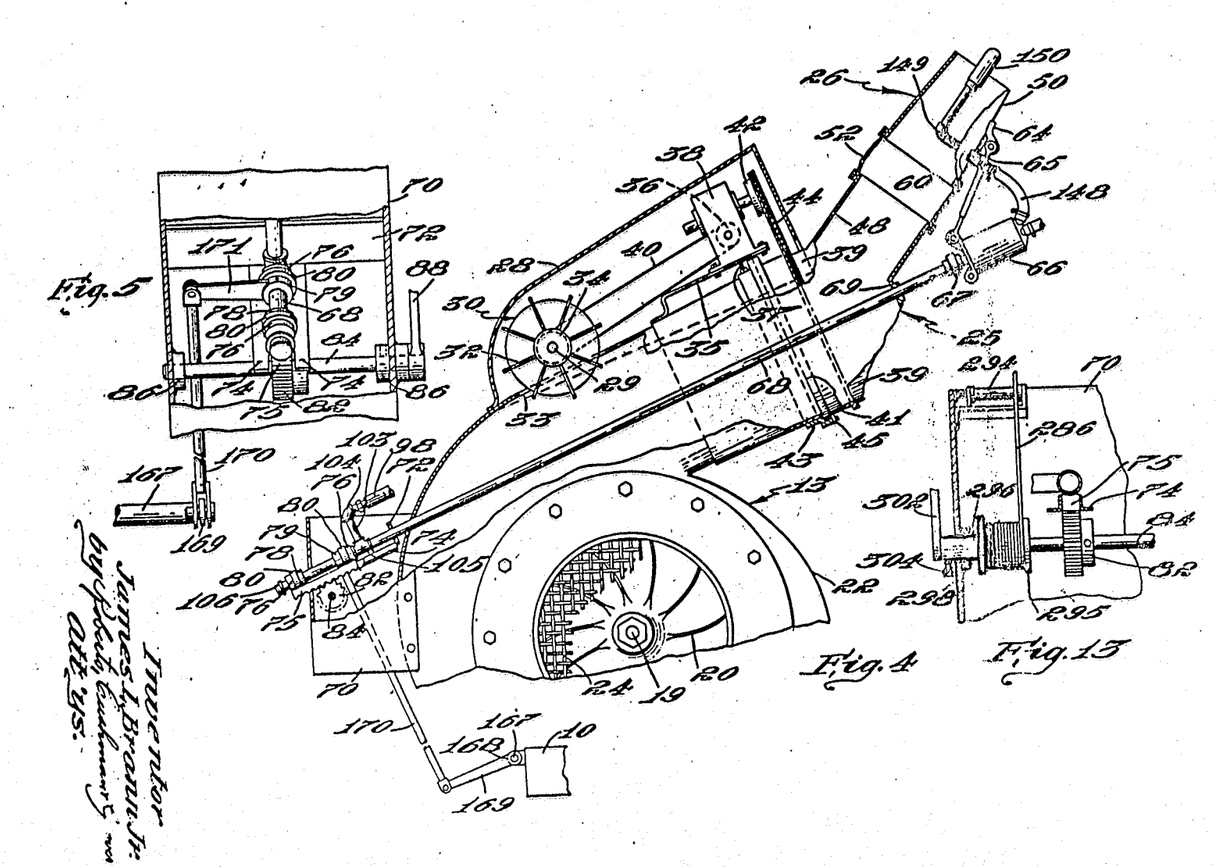
Fig. 4 is an end view in partial section showing the turret driving mechanism.
Fig. 5 is a fragmentary view in partial section showing the control mechanism for the distribution valve.

As is shown in Figs. 2 and 4, the blower 13 comprises a shaft 19 carrying a bladed impeller 20 which is surrounded by an involute shaped housing or scroll 22. Rotation of the impeller 20 by the engine 12, draws air into the impeller 20 through an inlet screen 24 and discharged upon being compressed out through the involute housing 22. From the housing 22 the air passes into a rotatable head or turret 25 having three equally spaced air discharge nozzles 26 angularly projecting therefrom so that as the turret 25 is rotated the streams or jets of air from the nozzles form an envelope having a conical configuration.

As is best illustrated in Fig. 4, the turret 25 is preferably rotated by means of energy taken from the air delivered by the compressor 13 although it is to be understood that it is also possible to supply the rotational torque directly from the engine 12 through a speed reducing mechanical drive or independently of the engine by means of a suitable electric motor. The driving mechanism illustrated in Fig. 4 for accomplishing the rotation of the turret 25 comprises an auxiliary housing 28 bolted or otherwise secured to the top of the compressor housing 22. Rotatably mounted upon a shaft 29 journaled in the housing 28 is a wheel 30 having a plurality of radially extending vanes or blades 32. The wheel 30 is positioned so that the lower portion thereof extends through an aperture 33 in the top of the compressor housing 22. The blades 32 secured to such lower wheel portion project into the air stream from the compressor 13 thus applying a rotational force to the wheel 30. A pulley 34 mounted on the shaft 29 is coupled to a pulley 36 upon the input shaft of a speed reduced unit 38 by means of a V-belt 40. The output shaft of the speed reducer 38 carries a small sprocket 42 which is in turn connected by means of a driving chain 44 to a large ring gear 46 (Fig. 2) disposed circumjacent the trunk portion 39 of the turret 25 so that the air flow resulting from the operation of the compressor 13 drives the wheel 30 to rotate the turret 25. The speed reducer 38 is mounted upon a platform 35 one end of which is fastened to the top of the housing 22. The other end of the platform 35 is supported by a threaded pin or rod 37 adjustment of which moves the platform thereby varying the tension in the chain 44.

The trunk 39 of the turret 25 has welded to the end thereof a sleeve 41 with a flange which rotatably engages a circular recess in the end of a collar 43 attached to the outlet portion of the blower housing 22. Axial separation of the sleeve 41 and the collar 43 is prevented by four equally spaced straps or fingers 45.

Figure 10:
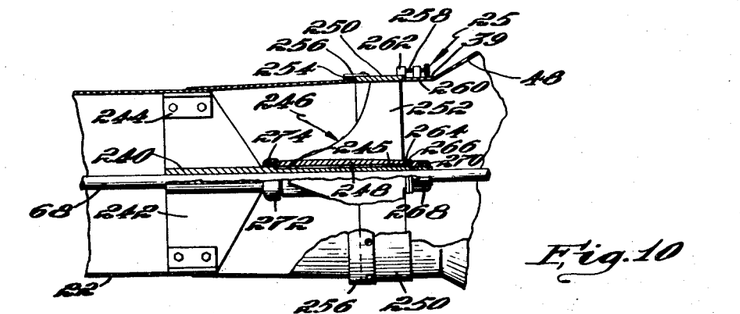
Fig. 10 is an end view in partial section showing an alternative method of rotatably supporting the turret.

An alternative means of rotatably supporting the turret 25, which has been found to reduce appreciably the friction between the turret and the blower housing 22, is shown in Fig. 10. A hollow shaft 240 is positioned circumjacent the conduit 68 by means of four equally spaced webs 242. The webs 242 are bolted to four angle pieces 244 which are in turn welded to the inside of the blower housing 22 so that the shaft 240 is supported by the housing and not upon the conduit 68.

It should be noted that in the several modifications herein disclosed the same numbers are used to designate parts that are substantially identical and common to the different views. Also, for simplicity and to avoid confusion, I have used the same numeral 25 to designate the turrets of Figs. 4, 10, and 12 since generally speaking they function the same and may be driven by any suitable conventional gear and chain drive such as that shown in Figs. 2 and 4 by reference numerals 44 and 46. Also, while I have shown in Fig. 2 an air-operated drive for the chain 44 any suitable conventional drive can be used to drive the chain to rotate the turret 25.

The end of the shaft 240 which projects beyond the webs 242 is reduced in diameter to accommodate two spaced needle bearings 245. The bearings 245 carry a rotatable spider 246 being enclosed in a cylindrical tube 248 which is the central structure member of the spider. Extending radially from the tube 248 to support an annular outer member 250 are a plurality of equally spaced webs 252. The annular member 250 is of substantially the same diameter as the outlet portion of the blower housing 22 and is connected thereto by means of an air seal comprising a felt ring 254 which is riveted to the outer surface of the housing so that it is in forcible contact with a retainer strip 256 secured to the adjacent end of the annular member 250.

The opposite end of the annular member is provided with a recess wherein is secured the end of the turret trunk 39. The turret 25 is maintained in engagement with the annular member 250 by means of several screws 258 each of which projects through the notch in a respective bifurcated piece 260 welded to the outer surface of the trunk 39 to engage a threaded aperture in a correlated block 262 welded to the outer surface of the annular member 250.

The turret end of the tube 248 is provided with a hardened steel thrust washer 264 mounted circumjacent the shaft 240 so that it is in contact with a similarly mounted thrust bearing 266 of oil impregnated sintered metal. The spider 246 and the thrust bearing 266 are maintained in position by means of a nut 268 which engages threads cut upon the end of the shaft 240. The nut 268 is locked by means of a set screw 270. A sealing cap 272 secured by a set screw 274 prevents the leakage of grease from the opposite end of the spider tube 248.

Each of the air discharge nozzles 26 comprises a straight portion 48 (Fig. 3) connecting at one end with the trunk 39 of the turret 25 and at the other end with a convergent portion 50 by means of a collapsible sleeve or bellows 52 (Fig. 2), made of a yieldable material such as rubber treated canvas. The relative position of the straight and convergent nozzle portions 48 and 50 is adjustably maintained by means of two hinged brackets 54. Each bracket 54 comprises a fixed member 56 secured to the side of the straight nozzle portion 48 and provided with an offset at the end of which is pivotally fastened an arm 62 extending from a movable member 58. The member 58 has a saddle portion 60 mounted circumferentially upon the convergent nozzle portion 50. Extending outwardly from each end of the saddle portion 60 is one of the arms 62 which pivotally connects with a respective fixed member 56 as described above, so that the respective pivotal points are disposed adjacent opposed sides of the bellows 52.

The saddle 60 is also provided with an eye 64 (Fig. 2) wherein is pivotally connected one end of an adjustable link such as a turnbuckle 65. The opposite end of the turnbuckle 65 is similarly connected to an eye or aperture 128 (Fig. 6) of a distribution valve 66 whose function will be described in detail below. As will be readily appreciated from the above, outward movement of the valve 66 along the axis of rotation of the turret 25 towards the right moves the nozzle portions outwardly to increase the apex angle of the cone envelope traced by the air streams from the nozzles and conversely movement of the valve 66 inwardly decreases the cone apex angle thereby to decrease the area sprayed.

The valve 66 is fastened by means of a pipe union 67 (Fig. 4) to the end of a conduit 68 whose axis coincides with the axis of rotation of the turret 26. The conduit 68 extends through a sealing gland 69 into the compressor housing 22 and out through an aperture in the opposite side of the housing into a gear box 70 secured to the side of the housing. The conduit 68 is journaled in a strap 72 which extends between two opposed vertical sides of the box 70. Two small structural angle pieces 74 are welded at one of their respective ends to the strap 72 and at their other ends to the rear of the box 70. A rack 75 is guided between the angle pieces 74 and is suspended from the conduit 68 by means of two collars 76 which are tack welded to the respective ends of the rack. Two similar collars 78 and 79 are secured by means of set screws (not shown) to the conduit 68 adjacent the collars 76 with a ball thrust bearing 80 interposed between each pair of adjacent collars so that longitudinal movement of the rack 75 results in a corresponding axial movement of the conduit 68, but permits rotation of the conduit while the rack is restrained by the angle pieces 74.

The rack 75 is moved longitudinally by rotation of a gear 82 whose teeth engage corresponding teeth upon the bottom of the rack. The gear 82 is fastened to a shaft 84 which is journaled in bearing bosses 86 in the respective sides of the box 70. One end of the shaft 84 extends through the box wall to engage one end of an arm 88. The opposite end of the arm 88 supports a handle 89 (Fig. 2) having a spring loaded pin which selectively engages one of a plurality of apertures 91 arranged about the shaft 84 as a double quadrant in a boss upon the end wall of the gear box 70.

As will be readily appreciated from the above, movement of the arm 88 changes the angle the axes of the respective nozzles 26 make with the axis of rotation of the turret 25, the adjusted position being maintained by the detent action of the pin in the handle 89 as it engages one of the apertures 91.

In the above described embodiment, an increase in the apex angle of the conical spray pattern also results in the downward directing of the lower portion of the pattern thereby tending to distribute the spray upon the terrain where it is wasted. In the embodiment shown in Fig. 12 this undesirable condition is overcome by manually adjusting the angle the lower portion of the conical spray pattern makes with the terrain and automatically maintaining this angle by conjointly increasing the angle the axis of the turret makes with the terrain as the apex angle of the spray pattern is increased.

Figure 12:
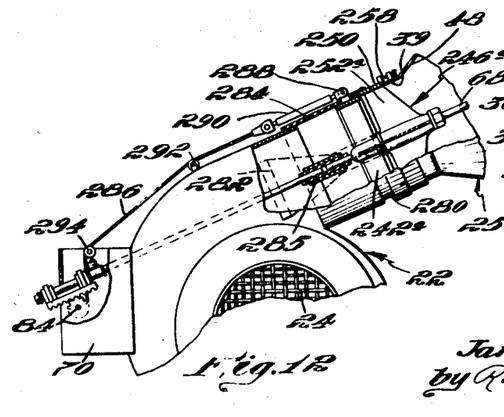
Fig. 12 is an end view in partial section showing another embodiment wherein the turret is moved to compensate for changes in the position of the air discharge nozzles.

The turret illustrated in Fig. 12 is similar to that in Fig. 10, the trunk 39 thereof being secured to the annular member 250 by means of the screws 256. The annular member 250 is carried by the webs 252a of a spider 246a which is rotatably journaled upon a shaft supported by the webs 242a in an analogous manner to that in which the spider 246 (Fig. 10) is journaled as has been described in detail heretofore. The webs 242a and 252a perform similar functions to the webs 242 and 252 but are different in shape to reduce the overall length of the turret support.

The outer ends of the webs 242a are welded to a tubular member 280 which is pivotally connected to arms 282 extending from the outlet portion of the blower housing 22. An air tight connection between the member 280 and the blower outlet is provided by a flexible portion of conduit 284 made for example of rubber reinforced with steel wire so that the angular relationship between the axes of the tubular member 28 and the outlet portion of the blower housing 22 can be varied. The conduit 68 is provided with a flexible portion 285, for example of rubber so that it does not interfere with the pivotal motion.

The desired relation between the blower outlet and the tubular member 280 is maintained by means of a cable 286 one end of which is connected by means of a turnbuckle 290 to an eye 288 extending from the top of the tubular member. The cable 286 passes over idler rolls 292 and 294 rotatably secured to the top of the housing 22 and the gear box 70 respectively and thence to a drum 295 (Fig. 13).

Figure 14:
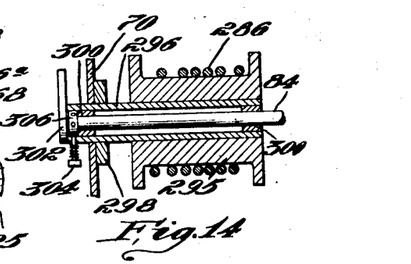
Fig. 14 is an enlarged view showing the details of the drum and controls therefor illustrated in Fig. 13.

As is best shown in Fig. 14, the drum 295 is carried upon a hollow shaft 296 which is journaled at one end in a boss 298 in the wall of the gear box 70 and disposed circumjacent the shaft 84 carrying the arm 88 (Fig. 2) for adjusting the apex angle of the spray pattern. The shafts 84 and 296 are maintained in coaxial relationship by means of two spaced bushings 300 which permit relative rotational movement between the shafts.

The end of the shaft 296 extending through the bushing 298 carries a manually operated handle or arm 302. From the foregoing description it will be evident that movement of the arm 302 winds or unwinds the cable 286 from the drum 295 thereby raising or lowering the turret. The turret may be locked in the position wherein the bottom portion of the spray pattern bears the desired spacial relationship to the terrain by means of a spring loaded pin 304. The pin 304 extends through an aperture in the shaft 296 to engage selectively recesses in the outer periphery of a head 306 upon the end of the shaft 84.

When the shaft 84 is locked by the pin upon the end of the arm 88 (Fig. 2) as described above, the pin 304 holds the drum 295 and the turret in a fixed position, such pin, however, not being used in the first form of the invention shown in Fig. 2. If the arm 88 is operated to move the air discharge nozzles 26, it will be evident that the drum 295 will be rotated conjointly thereby changing the position of the turret 25. The cable 286 is wound upon the drum 295 in such a direction that the turret is raised as the air discharge nozzles 26 are moved outwardly by the arm 88, the diameter of the drum being made such that upward movement of the turret exactly compensates for the downward shift of the spray pattern due to the outward movement of the air nozzles so that the bottom portion of the pattern maintains a constant relationship with respect to the terrain.

Figure 11:
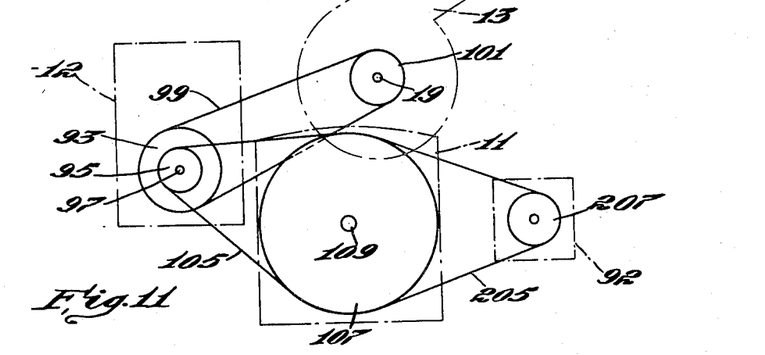
Fig. 11 is a schematic view of the blower drive.

In Fig. 11 are schematically shown the multiple V-belt drives coupling the engine 12 with the blower impeller 20 and a pump 92 for supplying the active chemical material as will be described below. Two sheaves 93 and 95 are secured to a shaft 97 which is selectively coupled to the output shaft of the engine 12 by a conventional clutch (not shown) brought into engagement to energize the drives by means of a lever 200 (Fig. 1). The larger driving sheave 93 is coupled by multiple V-belts 99 with a driven sheave 101 secured to the impeller shaft 19 of the blower 13.

The smaller driving sheave 95 is coupled by a set of multiple V-belts 105 with a large multiple groove sheave 107 carried upon a shaft 109. The shaft 109 extends through the forward wall of the tank 11 to connect with an agitator (not shown) which may be of any conventional type such as are used in spray apparatus to prevent the active chemical material from sinking to the bottom of the tank. A second set of multiple V-belts 205 connects the sheave 107 with a small sheave 207 on the input shaft of the pump 92.

The inlet port of the pump 92 is connected directly to the tank 11. The pump discharged is directed through a pressure regulating valve 94 (Fig. 1) and a quick shut-off valve 96 into a flexible hose 98. The quick shut-off valve 96 is controlled by a push rod 100 which extends over the top of the tank 11 so that it can be grasped by the operator riding upon the towing tractor. The pump discharge pressure is indicated by a gauge 102 connected in the discharge line between the regulating valve 94 and the shut-off valve 96. From the shut-off valve 96 the hose 98 extends to an elbow 104 (see also Fig. 4) which connects with a T 105 in the conduit 68 by means of a nipple 103. The end of the conduit 68 is blocked by a cap 106 so that the solution discharged from the pump is forced up the conduit into the distribution valve 66.

The valve 66 (Fig. 6) comprises a hollow shaft 110, the lower end of which has an external pipe thread for engaging the threads of the union 67 coupling the valve to the conduit 68. Two shoulders 112 are provided upon the shaft 110 against which bear the respective inner races of two ball bearings 114 and 115. The outer races of the bearings fit within a recess 116 in the lower portion of a valve housing 118 so that the housing is free to rotate with respect to the shaft 110. The upper bearing 114 is maintained in position by a shoulder 120 in the recess 116 which engages the outer race of the bearing. The inner race of the lower bearing 115 is pinched between the shaft shoulder 112 and a cover plate 122 secured to the bottom of the housing 118 by means of screws 124. The cover plate 122 has cast integrally therewith three ears 126 each having an aperture 128 therein forming an eye for engaging the pin of a respective turnbuckle 65 connecting with a correlated convergent nozzle portion 50 as described in detail heretofore.

Figures 6, 7, 9:
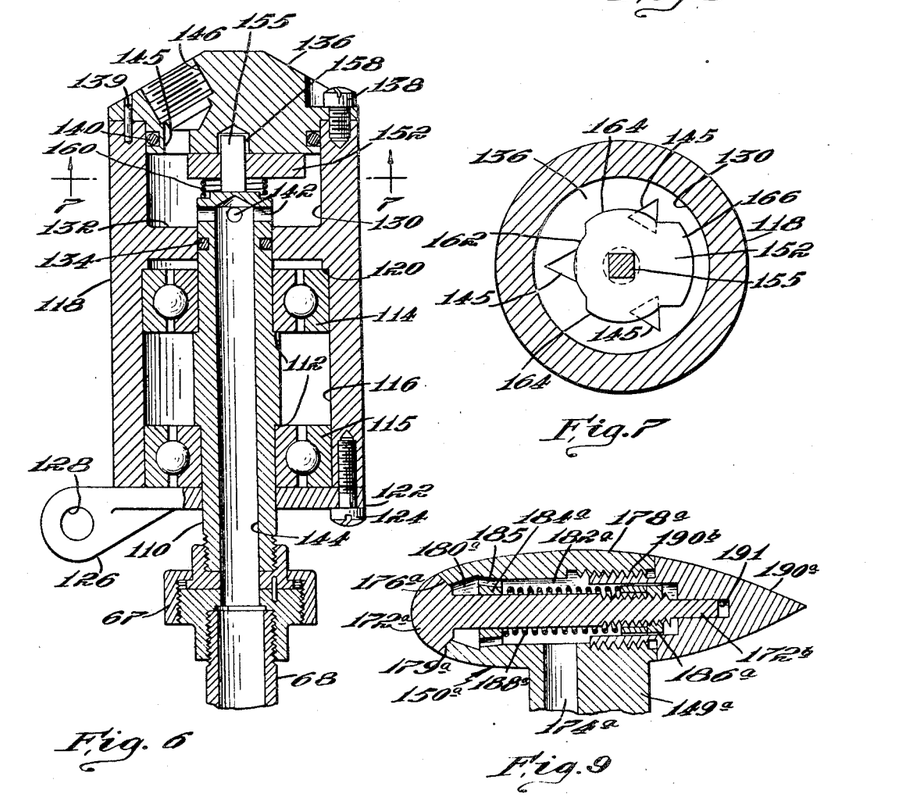
Fig. 6 is a longitudinal sectional view of the distribution valve.
Fig. 7 is a sectional view on line 7—7 of Fig. 6.
Fig. 9 is a sectional view of a second embodiment of an injection nozzle.

The upper portion of the housing 118 is provided with a recess 130 which is separated from the lower recess 116 by means of a partition or wall 132 having an aperture therein to accommodate the end of the shaft 110. An O-ring 134 of yieldable material, such as synthetic rubber, is retained in a circumferential recess on the shaft 110 so that the outer circumference of the ring bears against the side of the aperture in the wall 132 thereby to provide a fluid-tight seal between the recesses 116 and 130.

The upper recess 130 is closed by means of a cap 136 which is secured to the top of the housing 118 by means of screws 138. A dowel pin 139 maintains the position of the cap 136 constant with respect to the housing 118 and prevents improper assembly thereof. A fluid-tight seal between the cap 136 and the housing 118 is insured by an O-ring 140 retained in a recess in the cap so that it bears against the wall of the housing recess 130.

Near the upper end of the shaft 110 are two radially disposed apertures 142 drilled at right angles to one another to connect with an axial recess 144 in the shaft so that the solution of active chemical material delivered to the conduit 68 by the pump, as described heretofore, is forced through the recess 144 and the apertures 142 into the recess 130.

As is shown in Fig. 7, the bottom of the cap 136 has three equally spaced triangular recesses or ports 145 arranged with their respective apexes extending outwardly at equal distances from the centerline of the shaft 110. The recesses 145 each connect with a respective recess 146 (Fig. 6) having a pipe thread tapped or otherwise cut therein for connecting with a male connector upon one end of a flexible hose 148 (Fig. 2). The other end of each of the hoses 148 has a male connector which engages a threaded aperture in a boss extending from the saddle piece 60 of a respective nozzle 26. As is best shown in Fig. 4, the boss aperture extends through the wall of the convergent nozzle portion 50 to engage one end of a conduit 149. The conduit 149 extends to the axis of the nozzle portion 50, at which location is bent normally so that its end projects towards the open end of the nozzle portion 50. The projecting end of the conduit 149 carries an injection nozzle 150 which will be described in detail hereinafter.

From the above it will be evident that the solution in the recess 130 of the valve 66 will be distributed through the ports 145, the hoses 148 and the conduits 149 to the three injection nozzles 150 disposed respectively in the three air nozzles 26. The rate at which the solution is delivered to each of the injection nozzles 150 is determined by a valve plate 152 (Fig. 7) carried upon a square finger 155 projecting from the upper end of the shaft 110 into a centric recess 158 in the cap 136. A spring 160 is compressed between the end of the shaft 110 and the bottom of the valve plate 152 so that the top of the plate is forced against the bottom of the cap 136.

As described above, the valve housing 118 is fastened to the respective air nozzles 26 by means of the turnbuckles 65 and the hoses 148 so that the rotation of the turret 25 rotates the housing about the shaft 110. Since the valve plate 152 is fastened to the shaft 110, it will be evident that there is relative movement between the valve plate and the triangular recesses or ports 145. The valve plate 152 has a shape similar to that shown in Fig. 7. Approximately ninety degrees of the plate 152, designated 162, is of such diameter that the port 145 adjacent this portion is substantially fully open. The ninety degrees of the valve plate 152 designated 166 which is oppositely disposed the valve plate portion 162 has a greater diameter thereby partially to cover an adjacent port 145 so that the flow therethrough is reduced to approximately one fourth the flow with the port fully open. The ninety degree valve portions 164 interposed between the portions 162 and 166 are of intermediate diameter so that the flow through the ports adjacent these portions is reduced approximately one half.

The valve 166 is positioned with the valve portion 162 bisected by a vertical plane through the axis of rotation of the turret 25 so that as each air nozzle portion 50 is in the upper part of its rotational path, its injection nozzle 150 injects a maximum amount of active chemical solution into the air stream. Similarly during the bottom portion of the rotational path a minimum of active chemical solution is injected and intermediate amounts of solution are injected in the intermediate positions.

The position of the portions of the spray pattern of maximum and minimum injection of solution can be shifted by rotating the valve plate 152. Such rotation is accomplished by means of a handle 165 (Fig. 1) located near one side of the operator's platform 18. One end of the handle is provided with a spring loaded pin for engaging a selected aperture in a quadrant 166 thereby to maintain the handle in the adjusted position. The other end of the handle 165 is secured to one end of a horizontal control rod 167 which extends along the side of the frame 10. The opposite end of the rod 167 is journaled in a bearing bracket 168 (Fig. 4) carried by the frame 10 and has fastened thereto one end of an arm 169. The opposite end of the arm 169 pivotally engages a clevis upon the lower end of a vertical control rod 170. A second clevis upon the upper end of the rod 170 similarly engages an arm 171 (Fig. 5) which is welded to the collar 79 secured to the conduit 68 as mentioned heretofore. From the above it will be evident that movement of the handle 165 (Fig. 1) rotates the conduit 168 and therefore the valve shaft 110 with respect to the valve housing 118 so that the relative positions of the valve plate 152 and the ports 145 thus changing the relative position of the portions of the spray pattern of maximum and minimum injection of solution.

The nozzle 150 (Fig. 8) for injecting the solution of active chemical material into the air stream comprises a hollow stationary member 172 having a female pipe thread in one end of its central recess 174 for mating with the male threads upon the end of the conduit 149. The member 172 is reduced in diameter as at 176 to form a valve seat. The mating valve surface 179 is carried by a hollow movable member 178 disposed circumjacent the portion of the stationary member 172 which is of reduced diameter. The movable member 178 is cylindrical in shape and has a hollow interior divided into two cavities 180 and 182 by means of a partition or wall 184 having a centrically disposed aperture through which the end of the stationary member 172 projects. The projecting end of the stationary member 172 has a circumferential recess wherein is disposed a snap ring 186 which acts as a seat for a spring 188. The opposite end of the spring 188 bears against the wall 184 thereby forcing the valve surface 179 against the valve seat 176 to close the cavity 180. The cavity 182 is sealed by a cap 190 to retain any fluid which may leak by the wall 184.

Figure 8:
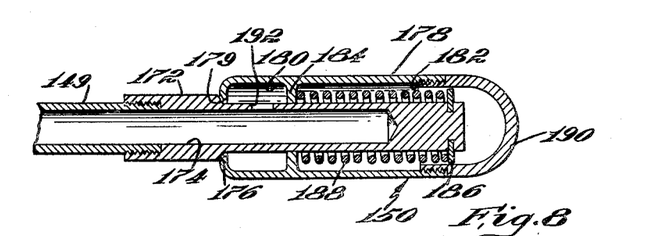
Fig. 8 is a sectional view of one embodiment of an injection nozzle.

When the solution bearing the active material is introduced under pressure into the conduit 149 as has been described in detail heretofore, the solution fills the recess 174 and passes through a port 192 in the wall of the conduit into the cavity 180. The effective area of the cavity wall 184 is greater than the area of the opposite end of the cavity 180 carrying the valve surface 179 so that as the pressure builds up in the cavity the member 178 is moved with respect to the member 172. Such relative movement of the members 172 and 178 moves the valve surface 178 away from the seat 176 so that the solution in the cavity 180 is discharged in a conical spray in a direction contra to the direction of air flow from the correlated air discharge nozzle 26.

Another type of injection nozzle 150a wherein the hollow outer member or body 178a is stationary and the inner member 172a is movable with respect thereto is illustrated in Fig. 9. The conical valve seat 176a is cut in one end of the hollow body 178a. The mating valve surface 179a is carried upon the inner member 172a, the valve being closed when the members 172a and 178a are in the telescoped position shown in Fig. 9. The body 178a is divided into two cavities 180a and 182a by a partition 184a having a plurality of small apertures 185 arranged about a central aperture accommodating the end of the movable member 172a. The members 172a and 178a are yieldably maintained in telescoped relationship by means of a spring 188a located in the cavity 182a so that one end thereof bears against the partition 184a. The opposite end of the spring 188a seats against a nut 186a engaging external threads upon the shank of the inner member 172a The end 172b of the member 172a projects beyond the threaded shank, to engage an aperture 191 in a cap 190a which acts as a way guiding the end of the member 172a. The cap 190a is secured to the body 178a by means of external threads 190b which engage mating threads upon the wall of the cavity 182a.

Fluid is introduced into the nozzle through a passageway 174a in a supporting strut 149a which is preferably cast integral with the body 178a. The passageway 174a connects with the cavity 182a so that fluid flows into the cavity and thence through the apertures 185 to fill the cavity 180a. When the pressure in the cavity 180a builds up sufficiently so that the force exerted upon the member 172a exceeds the biasing force exerted upon the member by the spring 188a, the member 172a moves outwardly until the flow out of the cavity between the valve surface and seat 179a and 176a lowers the pressure within the cavity until the force resulting from the fluid pressure is in equilibrium with the spring force.

Preparatory to spraying, the tank 11 (Fig. 1) is filled through a hatch 202 with a solution of the active chemical agent or material to be sprayed upon the foliage. The engine 12 is started and the drive for the pump and blower 13 connected thereto by means of the clutch controlled by means of the clutch lever 200. The volume of air flow is adjusted to the desired amount by varying the engine speed by means of a conventional throttle (not shown). The handle 89 (Fig. 2) is moved to the position regulating the convergent nozzle portions 50 so that the conical envelope of air is directed to the required altitude to reach the top of the trees to be sprayed.

The apparatus is then towed through the orchard or along the highway so that the air envelope comes into contact with the foliage at which time the operator opens the valve 96 by means of the control linkage 100 so that the active chemical solution is injected by the nozzles 150 into the air streams from the respective air distribution nozzles 26. The operator can also regulate the spray pattern to compensate for a head or tail wind by means of the handle 165, as described heretofore, whereby it is possible to apply the most concentrated mist ahead or behind the highest point reached by the spray.

It should be understood that the present disclosure is for the purpose of illustration only and that this invention includes all modifications and equivalents which fall within the scope of the appended claims.

I claim:

1. Mist spraying apparatus comprising a prime mover, a blower driven by the prime mover, a turret connected to the outlet of the blower and having a plurality of air directing nozzles projecting therefrom, means for rotating the turret so that the nozzles are moved orbitally to direct jets of air in a path having a conical envelope, a tank for holding a supply of active chemical material in solution, a plurality of injection nozzles positioned in the respective air directing nozzles for injecting active material into the jets, a conduit having its axis coinciding with the axis of rotation of the turret, means including a pump connecting one end of the conduit with the tank, a distribution valve connected to the other end of the conduit, and a plurality of flexible conduits connecting the respective injection nozzles with the valve, said valve being arranged to vary the amount of active material supplied to the injection nozzles with respect to the position of the corresponding air nozzles in their orbit.

2. Mist spraying apparatus comprising a prime mover, a blower driven by the prime mover, a turret connected to the outlet of the blower and having a plurality of air directing nozzles projecting therefrom, means for rotating the turret so that the nozzles are moved orbitally to direct jets of air in a path having a conical envelope, a tank for holding a supply of active chemical material in solution, a plurality of injection nozzles positioned in the respective air directing nozzles for injecting active material into the jets, a conduit having its axis coinciding with the axis of rotation of the turret, means including a pump connecting one end of the conduit with the tank, a distribution valve connected to the other end of the conduit, a plurality of flexible conduits connecting the respective injection nozzles with the valve, said valve being arranged to vary the amount of active material supplied to the injection nozzles with respect to the position of the corresponding air nozzles in their orbit, and means for rotating the conduit and connected distribution valve thereby to vary the distribution pattern of the active material.

3. Mist spraying apparatus comprising a prime mover, a blower driven by the prime mover, a turret connected to the outlet of the blower and having a plurality of air directing nozzles projecting therefrom, each of said nozzles having a yieldable portion, means for rotating the turret so that the nozzles are moved orbitally to direct jets of air in a path having a conical envelope, a tank for holding a supply of active chemical material in solution, a plurality of injection nozzles positioned in the respective air directing nozzles for injecting active material into the jets, a conduit having its axis coinciding with the axis of rotation of the turret, means including a pump connecting one end of the conduit with the tank, a distribution valve connected to the other end of the conduit, a plurality of flexible conduits connecting the respective injection nozzles with the valve, said valve being arranged to vary the amount of active material supplied to the injection nozzles with respect to the position of the corresponding air nozzles in their orbit, a plurality of links extending between the distribution valve and the respective ends of said air directing nozzles, and means for axially moving the conduit and the connected distribution valve to change the effective diameter of the orbit of said air distribution nozzles thereby to change the apex angle conical envelope.

4. Mist spraying apparatus comprising a turret having a plurality of air directing nozzles projecting therefrom, means for rotating the turret so that the nozzles are moved orbitally to direct jets of air in a conical-like path, a plurality of injection nozzles positioned in the air directing nozzles for injecting material into the jets, a conduit having its axis coinciding with the axis of rotation of the turret for supplying material to said injection nozzles, a distribution valve connecting said conduit to said injection nozzles to vary the amount of active material supplied to the injection nozzles with respect to the position of the corresponding air nozzles in their orbit and means connected to said distribution valve by said conduit to change the effective diameter of the orbit of said air distribution nozzles by changing the apex angle of said conical path.

5. A mist spraying apparatus for objects such as trees, vines and crops, comprising in combination a vehicle adapted to move along the side of the objects to be sprayed, said vehicle carrying a tank for holding a supply of active chemical material in solution, a prime mover, a blower driven by the prime mover, a turret connected to the outlet of the blower and having a plurality of air directing nozzles projecting therefrom on the side of the vehicle so as to face the objects to be sprayed, means for rotating the turret so that the nozzles are moved orbitally to direct jets of air in a path having a conical envelope, means for changing the angularity of the nozzles relative to each other so as to adjust the conical angle of the envelope to give various degrees of dispersion, a plurality of injection nozzles positioned in the respective air directing nozzles for injecting active chemical material into the jets of air, a pump for supplying said material to the nozzles, a conduit between the pump and the nozzles, a distribution valve between the conduit and the nozzles, said distribution valve being arranged to reduce the amount of active chemical material supplied to the injection nozzles during the lower parts of their orbits and relatively increase the amount for the upper parts of their orbits so as to diminish the amount of active chemical material thrown near the ground and increase the amount thrown up in the air so as to tend to equalize the effectiveness of the chemical on the objects from above and below.

References Cited in the file of this patent

UNITED STATES PATENTS

| Number | Name | Date |
|---|---|---|
| 422,458 | Stiebel | Mar. 4, 1890 |
| 1,224,560 | Needham et al. | May 1, 1917 |
| 1,953,311 | Peik | Apr. 3, 1934 |
| 1,996,159 | Kittredge | Apr. 2, 1935 |
| 2,373,553 | Folke | Apr. 10, 1945 |
| 2,374,955 | Raper | May 1, 1945 |
| 2,429,374 | Shade | Oct. 21, 1947 |
| 2,459,244 | Sellars | Jan. 18, 1949 |
| 2,476,960 | Daugherty | July 26, 1949 |
| 2,511,969 | Chapin | Jan. 20, 1950 |

FOREIGN PATENTS

| Number | Country | Date |
|---|---|---|
| 328,707 | Great Britain | May 8, 1930 |
| 679,295 | Great Britain | Sept. 17, 1952 |